Dec. 16, 1969                J. R. BENDER                3,483,953
DISC ELEMENT CONSTRUCTION FOR DISC BRAKE
Filed March 29, 1968                                2 Sheets-Sheet 1

INVENTOR.
JOHN R. BENDER
BY
William N. Antonio
ATTORNEY

Dec. 16, 1969   J. R. BENDER   3,483,953
DISC ELEMENT CONSTRUCTION FOR DISC BRAKE
Filed March 29, 1968   2 Sheets-Sheet 2

INVENTOR.
JOHN R. BENDER
BY
William N. Antonis
ATTORNEY

United States Patent Office 3,483,953
Patented Dec. 16, 1969

3,483,953
DISC ELEMENT CONSTRUCTION FOR DISC BRAKE
John R. Bender, South Bend, Ind., assignor to The Bendix Corporation, a corporation of Delaware
Filed Mar. 29, 1968, Ser. No. 717,237
Int. Cl. F16d 65/12
U.S. Cl. 188—218     8 Claims

ABSTRACT OF THE DISCLOSURE

The following relates to a friction disc element construction for a disc brake which is formed of a plurality of interconnected annularly arranged segments. Each of the segments includes a groove in the radially extending ends thereof for providing opposed cantilever-like flat projections capable of flexing inwardly towards each other and clamp-like members which are operatively connected to the projections for preventing them from curling outwardly. Each segment is formed of a pair of outer plates, a structurally weak high enthalpy inner core sandwiched therebetween, and a retainer band around the periphery of the core to form a cage therearound.

BACKGROUND OF THE INVENTION

Disc brakes which utilize segmented annular disc elements arranged to permit individual thermal expansion of the disc segments without interference between adjacent segments are shown and described in various prior art patents, such as U.S. Patents 2,423,881, 2,531,696, 2,683,504, 2,893,519, and 3,237,731. All disc brake elements to a greater or lesser degree, including those shown in the foregoing patents, tend to warp and wear upon extensive encounters with thermal shocks. Such warp and wear obviously will have a direct bearing on the effectiveness and life of any brake. In other words, higher degrees of warp and wear will reduce brake effectiveness and brake life, whereas, lesser degrees of warp and wear will increase brake effectiveness and brake life. Accordingly, any disc element construction which would eliminate or substantially reduce such warp and wear would constitute a significant advance in the art, and, particularly so, if such construction is less expensive than disc elements which are presently in use.

Furthermore, various prior art patents disclose brake disc designs which incorporate in one manner or another structurally weak high enthalpy materials. However, many of these designs are inadequate because of failure to properly accommodate for thermal expansion between dissimilar materials.

SUMMARY OF THE INVENTION

Accordingly, in view of the foregoing, it is an object of the invention to provide a unique friction disc element construction which is segmented in such a manner that it can properly accommodate for thermal expansion of the disc per se and thermal expansion between dissimilar materials.

Another object of this invention is to provide a segmented disc element which will increase brake effectiveness and extend brake life.

Another object of this invention is to provide a segmented disc element which absorbs heat in a more uniform manner and withstands thermal shocks better than existing disc elements.

An important object of this invention is to provide a segmented disc element wherein each segment is formed so that the oppositely disposed faces of each segment are capable of flexing inwardly towards each other at the leading and trailing ends thereof but which are prevented from curling outwardly because of thermal distortions.

More specifically, it is an object of this invention to provide a segmented disc element wherein clamp-like shear members are interposed between adjacent segments and are operatively connected thereto so as to permit inward flexing of the oppositely disposed faces of the leading and trailing ends but not outward curling thereof.

Another important object of this invention is to provide a segmented disc element wherein each segment is formed of a pair of oppositely disposed outer plates, a structurally weak high enthalpy inner core sandwiched therebetween, and a retainer band around the periphery of the core for holding the core material in position and retaining the core material within the band should the structurally weak material fracture.

Other objects, features and advantages of the invention will be apparent from the following description of the invention taken in connection with the accompanying drawings.

DESCRIPTION OF THE PREFERRED EMBODIMENT

Figure 1:
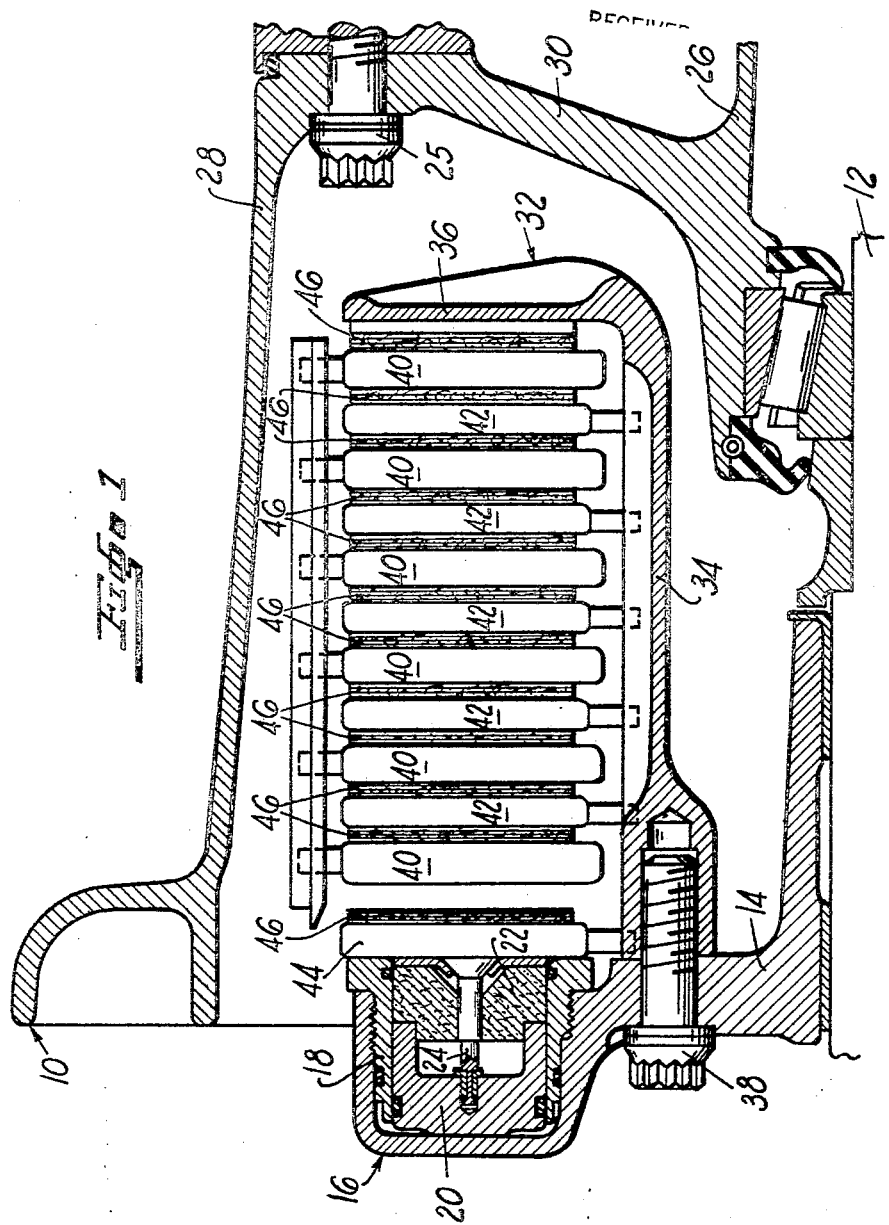
FIGURE 1 is a sectional view of a portion of a symmetrical wheel and brake assembly which incorporates the invention.

Referring to FIGURE 1, it will be seen that the wheel and brake assembly, which is illustrated includes a wheel 10 rotatably mounted on a stationary axle 12 and a stationary carrier member 14 which is connected to the axle through any suitable means, such as by a direct bolt connection (not shown). The construction for rotatably mounting the wheel 10 to axle 12 and fixing the stationary carrier member 14 to the axle 12 is well known, and a detailed description thereof is not deemed to be necessary. The carrier contains a plurality of fluid motors 16 each of which includes a protective sleeve 18 threadedly secured to the carrier and a piston 20 located and slidable in the sleeve. A block of insulating material 22 is secured to the head end of the piston by a threaded pin 24 for protecting the hydraulic brake fluid from the heat generated during braking. The wheel 10, which is formed of two sections fastened together by a plurality of bolts 25, includes a hub portion 26 and a rim portion 28 interconnected by a plurality of spokes 30. A torque tube 32 which includes a sleeve 34 and an annular backing plate flange 36 is fixedly secured to the carrier member 14 by a plurality of circumferentially spaced bolts 38.

The brake which is illustrated is of the disc type and includes a plurality of interleaved rotors 40 which are splined to and are rotated by the aircraft wheel 10 and includes stators 42 which are splined to sleeve 34 of the torque tube 32. The specific novel construction of the rotors will be described hereafter. Both the rotors and stators are movable axially and are sometimes referred to as a brake "stack." It is the frictional engagement of these relatively rotatable rotors and stators which produces the desired braking action on the aircraft wheel. A pressure plate 44, which is suitably attached to the fluid motor 16, forces the rotors 40 and stators 42 against each other upon actuation of the motors by thrusting at one side of the stack and biasing the entire stack against the backing plate 36. Pressure plate 44, each of the stators 42, and the backing plate have friction material lining 46 provided thereon.

Figure 2:
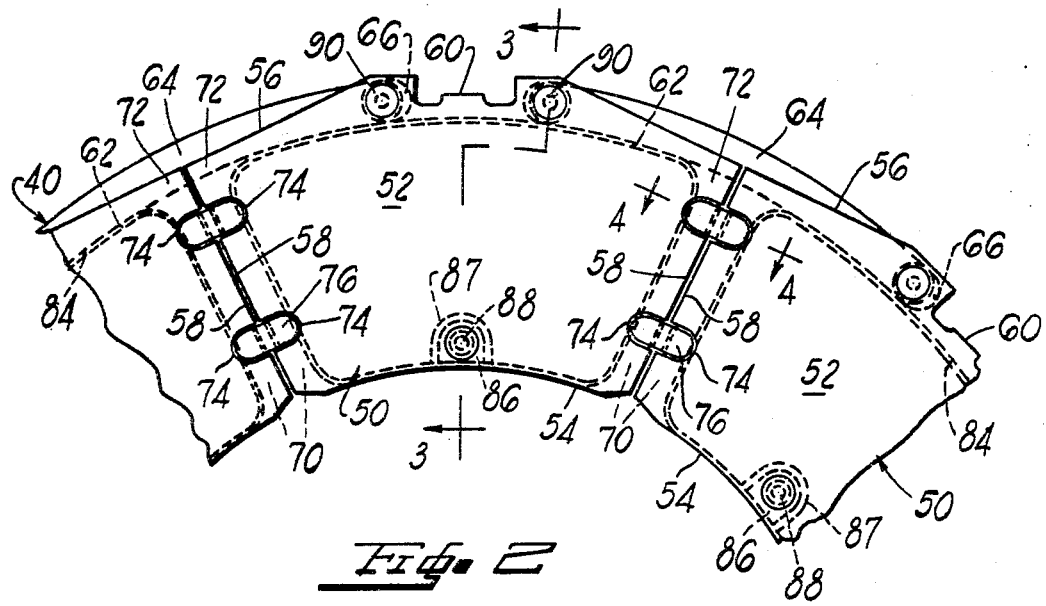
FIGURE 2 is a side elevation of a portion of a symmetrical rotor removed from the brake assembly of FIGURE 1.
Figures 3, 4:
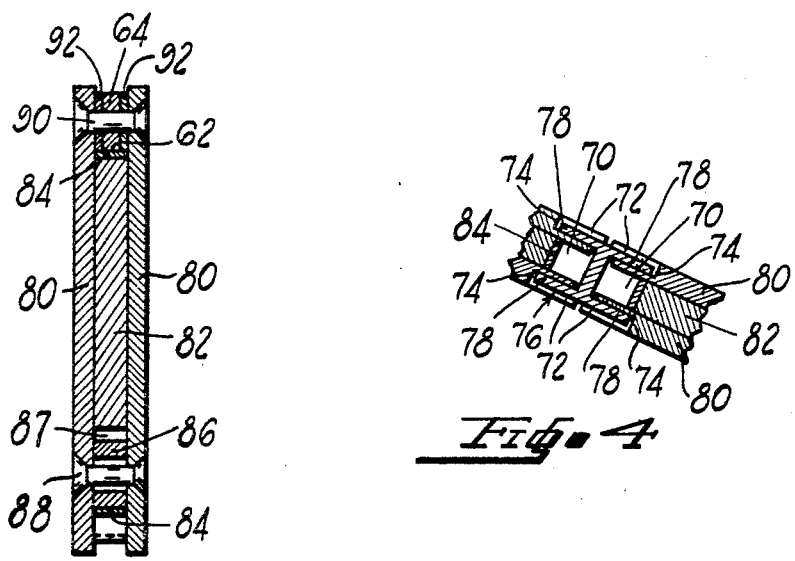
FIGURE 3 is an enlarged sectional view taken along line 3—3 of FIGURE 2.
FIGURE 4 is an enlarged sectional view taken along line 4—4 of FIGURE 2.

Referring to FIGURES 2–4, which show the novel detailed construction of each of the rotors 40, it will be seen that each rotor is comprised of a plurality of annularly arranged segments 50, each of which has oppositely disposed faces 52, a radially inner edge 54, a radially outer edge 56, and two angularly disposed ends 58 extending between the edges. A key slot notch 60 is located at the radially outer edge 56 and intermediate the ends 58 of each of the segments. Each of these notches slidably engage axially extending keys located on the inner periphery of the aircraft wheel 10. It will be understood that, if desired, the key-slot arrangement could be reversed so that the slot is formed in the wheel and the key is formed on the outer edge of each segment 50.

Circumferentially extending grooves 62 are located in the radially outer edge 56 of each of the segments and extend from both ends 58 of each segment to the key slot notch 60 of each segment. A plurality of link members 64 are located in the circumferentially extending grooves 62 and are utilized to interconnect the segments to form an annular disc. More specifically, each link member has the ends 66 thereof connected to annularly adjacent segments substantially at the location of the key slot notch 60. By connecting the ends of the link member as close to the key slot notches as possible, that is, as close as possible to an intermediate position of the segment, the effects of shrinkage are minimized.

In order to reduce the wear rate of the disc element segments and thus increase the life thereof, each of the segments 50 is formed with radially extending grooves 70 which are located in the leading and trailing ends 58 of the segment. These grooves 70 provide opposed cantilever-like flat projections 72 which are capable of flexing towards each other. This resulting flexibility at the leading and trailing edges of each segment prevents the segment from, in effect, "plowing" through the surface of the adjacent disc element and thus increases the life of the disc elements by reducing lining wear and wear on the segments.

Each of the cantilever-like flat projections is formed with two surface recesses 74 which are oppositely disposed from the surface recesses of the opposed cantilever-like flat projection. Interposed between each pair of annularly adjacent segments are two H-shaped clamp-like members 76 each, in effect, having bifurcated ends 78 which are located in the oppositely disposed surface recesses 74. These clamp-like members are not only utilized to take the shear loads which arise during braking, but more importantly are utilized to prevent outward curling of the cantilever-like flat projections 72 which may result because of thermal distortions.

Referring to the drawings it will be noted that each segment 50 is formed of a pair of oppositely disposed outer plates 80, and a dimensionally smaller inner core 82 sandwiched therebetween which is arranged with respect to the plates to define the circumferentially extending grooves 62 and radially extending grooves 70. It will also be noted that the outer plates only contain the key slot notch 60, and the portions of the plates which overhang the edge of the inner core provide the opposed cantilever-like flat projections which are capable of flexing towards each other. In order that the rotating brake disc is capable of accommodating the usage of solid high enthalpy materials which are structurally weak and brittle, such as, beryllium oxide, graphite, boron nitride, boron carbide, etc., the non-structural inner core 82 is caged by a retainer band 84 which is located around the periphery of the core. The retainer band is formed of a structural material, such as steel, and is somewhat lesser thickness than the non-structural high enthalpy core so as to maintain intimate contact between the outer face plates and the core. In order to maintain the core between the outer plates and in proper alignment therewith an alignment member 86 is suitably attached to the retainer band 84 and extends into an opening 87 formed in the core of each segment. A rivet 88 extends through the oppositely disposed plates and the alignment member. Each segment is thus triangularly positioned by the rivet 88 through the alignment members and the rivets 90 at the ends of the restrained links 64. Spacers 92 are located between the restrained links and the outer plates 80. From the foregoing it will be apparent that the prime purpose of the retainer band 84 is twofold, namely, to hold the high enthalpy core material in proper position and to retain the structurally weak core material within the ring should it fracture. With such an arrangement the rotor disc would be functional even if the core material fractured.

The several practical advantages which flow from this invention are believed to be obvious from the foregoing description, and other advantages may suggest themselves to those who are familiar with the art to which the invention relates.

Furthermore, although this invention has been described in connection with certain specific embodiments, it will be obvious to those skilled in the art that various changes may be made in the form, structure, and arrangement of parts without departing from the spirit of the invention. For example, although the drawings disclose the invention in connection with a rotor it will be understood that the invention could be utilized in connection with a segmented stator. In addition the key-slot engaging means need not necessarily be located in the radially outer edge of the segment, but could also be located on the radially inner edge, if desired. In other words, depending on the wheel and brake arrangement, the rotors could be driven from the outer or inner diameter thereof, as required, and the stators could, likewise, be keyed to a torque member at the outer or inner diameter thereof, as required. Accordingly, I do not desire to be limited to the specific embodiments disclosed herein.

Having thus described the various features of the invention, what I claim as new and desire to secure by Letters Patent is:

1. In a wheel and brake assembly having axially extending key-slot type engaging means, a friction disc element comprising a plurality of annularly arranged segments each having oppositely disposed faces, a radially inner edge, a radially outer edge, and two angularly disposed ends extending between said edges, means for interconnecting said segments to form an annular disc, mating key-slot type engaging means operatively connected to said disc for slidable engagement with said first mentioned key-slot type engaging means, radially extending groove means located in the ends of each of said segments and extending the full length thereof for providing opposed unsupported cantilever-like flat projections defining open radial slots substantially throughout their length when assembled and capable of substantial flexing inwardly towards each other, said projections having faces in the same planes as the oppositely disposed faces of said segments, and means operatively connected to said projections for preventing said projections from curling outwardly and for taking the shear loads which occur during braking.

2. The structure, as defined in claim 1, wherein said segments are laminated segments having oppositely disposed plates each of which includes said cantilever-like flat projections at the ends thereof.

3. The structure, as defined in claim 2, wherein said segments each include an inner core for forming said groove means with said oppositely disposed plates and spacing same from each other.

4. The structure, as defined in claim 3, wherein said inner core includes a retainer band around the periphery thereof for caging said core.

5. The structure, as defined in claim 1, wherein pairs of oppositely disposed surface recesses are formed in said segment faces at both angularly disposed ends thereof, and said means for preventing outward curling of said projections and for taking said shear loads comprises clamp-like shear members each having bifurcated ends which are located in a pair of said oppositely disposed surface recesses.

6. The structure, as defined in claim 5, wherein each clamp-like shear member is interposed between each pair of annularly adjacent segments and is formed with two bifurcated ends, one bifurcated end of which is located in a pair of said oppositely disposed surface recesses of one segment and the other bifurcated end of which is located in a pair of said oppositely disposed surface recesses of the next adjacent segment.

7. In a wheel and brake assembly having axially extending key-slot type engaging means, a friction disc element comprising a plurality of annularly arranged laminated segments each having oppositely disposed faces, a radially inner edge, a radially outer edge, and two angularly disposed ends extending between said edges, said segments each including a pair of oppositely disposed plates, means for interconnecting said segments to form an annular disc, mating key-slot type engaging means operatively connected to said disc for slidable engagement with said first mentioned key-slot engaging means, radially extending groove means located in the ends of each of said segments for providing said plates with opposed cantilever-like flat projections at the ends thereof, said cantilever-like flat projections being capable of flexing inwardly towards each other, means operatively connected to said projections for preventing said projections from curling outwardly, an inner core located between said plates for forming said groove means with said oppositely disposed plates and spacing same from each other, and a retainer band located around the periphery of said core for caging said core, said retainer band including an alignment member extending therefrom and said core including an opening therein for receiving said alignment member.

8. The structure, as defined in claim 7, which includes means extending through said oppositely disposed plates and said alignment member for maintaining said core between said plates.

References Cited

UNITED STATES PATENTS

| | | | |
|---|---|---|---|
| 2,303,201 | 11/1942 | Eason | 192—107 X |
| 2,893,519 | 7/1959 | Martin. | |
| 3,237,731 | 3/1966 | Du Bois. | |
| 3,403,759 | 10/1968 | Holcomb | 192—107 X |

FOREIGN PATENTS 1,500,824  10/1967  France.

GEORGE E. A. HALVOSA, Primary Examiner

U.S. Cl. X.R.

192—107